(12) United States Patent
Sternowski (10) Patent No.: US 8,891,673 B1
(45) Date of Patent: Nov. 18, 2014

(54) SYSTEM AND METHOD FOR A MULTICHANNEL TRANSMITTER AND RECEIVER

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 14/176,438

(22) Filed: Feb. 10, 2014

Related U.S. Application Data (62) Division of application No. 13/428,070, filed on Mar. 23, 2012, now Pat. No. 8,693,584.

(60) Provisional application No. 61/507,351, filed on Jul. 13, 2011.

(51) Int. Cl.
*H04K 1/02* (2006.01)
*H04L 25/08* (2006.01)

(52) U.S. Cl.
CPC ...................................... *H04L 25/08* (2013.01)
USPC .......................................................... 375/296

(58) Field of Classification Search
USPC ............... 375/295, 296; 455/91, 114.2, 114.3
See application file for complete search history.

(56) References Cited

U.S. PATENT DOCUMENTS

| | | | |
|---|---|---|---|
| 5,302,914 A * | 4/1994 | Arntz et al. | 330/129 |
| 5,745,846 A | 4/1998 | Myer et al. | |
| 6,256,485 B1 | 7/2001 | Heard | |
| 7,599,421 B2 * | 10/2009 | Sorrells et al. | 375/147 |
| 7,937,059 B2 | 5/2011 | Sorrells et al. | |
| 2009/0196385 A1 | 8/2009 | Hunter et al. | |
| 2010/0202566 A1 | 8/2010 | Fudge et al. | |

OTHER PUBLICATIONS

Yi-De Liu, An Efficient Iterative Algorithm for Finding the Minimum Sampling Frequency of Multiple Bandpass Signals, Aug. 18, 2009.
Hittie Microwave Corporation product data sheet, High Speed Logic SMT, Hittite Microwave Corporation, Chelmsford, MA—Date unknown but prior to U.S. filing date.

\* cited by examiner

*Primary Examiner* — Vineeta Panwalkar
(74) *Attorney, Agent, or Firm* — James R. Sytsma; Shuttleworth & Ingersoll, PLC (57) ABSTRACT

A image converter receives and mixes a plurality of input signals with an impulse signal to generate an alias signal spectrum. An analog post-processor receives the alias signal spectrum and separates out a plurality of bandlimited signals and recombines them into a transmit signal. A processor monitors a power level of the plurality of input signals and dynamically, separately modifies one of the plurality of bandlimited signals with a command signal to the analog post-processor in response to a change in power level in the corresponding input signal.

15 Claims, 8 Drawing Sheets

SIGNAL MODIFIER 136

| | Bd | MIN | MAX | BW |
|---|---|---|---|---|
| 1 | 1 | 698.000 | 716.000 | 18.000 |
| 2 | 2 | 776.000 | 790.000 | 14.000 |
| 3 | 3 | 806.000 | 849.000 | 43.000 |
| 4 | 4 | 880.000 | 915.000 | 35.000 |
| 5 | 5 | 1850.000 | 1910.000 | 60.000 |
| 6 | 6 | 1920.000 | 1980.000 | 60.000 |
| 7 | 7 | 1710.000 | 1785.000 | 75.000 |
| 8 | 8 | 2500.000 | 2570.000 | 70.000 |
| 9 | 9 | 1600.000 | 1660.000 | 60.000 |

SYSTEM AND METHOD FOR A MULTICHANNEL TRANSMITTER AND RECEIVER

This is a divisional of application Ser. No. 13/428,070 filed Mar. 23, 2012 and this application claims priority to U.S. Provisional Patent Application 61/507,351 filed Jul. 13, 2011, which application is incorporated by reference herein.

BACKGROUND OF THE INVENTION

The present invention relates to radio receivers and transmitters, and more specifically to a wideband, multichannel spectrum receiver with automatic gain control, and a wideband, multichannel spectrum transmitter with automatic level control.

There are numerous requirements for radio receivers that can cover an extremely wide frequency band while guaranteeing a high probability of intercept for any signal within this band. This is particularly true with regard to electronic warfare receivers that are used to receive a signal that does not have a previously known carrier frequency.

The dilemma for system designers is that the huge 40 GHz bandwidth of radio and radar signals in use today, and the dynamically varying near-far signal strengths require an incredibly complex receiver array, including wideband receivers, narrowband receivers, filters, notches, and scanning receivers. Virtually every existing technique and equipment known to the radio reception world has to be rolled into such a system.

In view of the need for a multichannel receiver system having an extremely wide intercept bandwidth and a high probability of intercept, there exists a requirement for a single, wideband, multichannel spectrum receiver with the ability to identify individual narrow signals.

SUMMARY

According to one embodiment, there is provided a circuit for determining the frequency of a signal of interest in a composite RF signal. The circuit comprises an analog preprocessor configured to receive a composite RF signal from an antenna and produce bandlimited frequency sub-bands S1 to Sn. An image converter is configured to receive and alias the band limited frequency sub-bands S1 to Sn to baseband and generate a first alias-band output signal and a second alias-band output signal. A processor is configured to receive the two alias-band output signals, determine the frequency shift of the signal of interest between the two alias-band output signals, and calculate the frequency for the signal of interest using the frequency shift.

The image converter produces the alias-band output signals by separately mixing the bandlimited frequency sub-bands S1 to Sn with two impulse waves at frequencies Fs and Fs+k. The processor is also configured to use the value, k, which represents a difference between the sampling frequencies, in determining the frequency for the signal of interest. More specifically, in one embodiment, the image converter includes two mixers for mixing the bandlimited frequency sub-bands S1 to Sn with the corresponding impulse waves, Fs and Fs+k. In an alternative embodiment, a single mixer is used with a single tunable impulse source to switch between mixing with impulse waves, Fs and Fs+k.

The impulse waves are generated with an impulse generator that uses a logic gate, specifically an AND gate, to transform a square wave input into an impulse wave output. The square wave is received at a first input of the AND gate and a time delayed and inverted square wave is received at the second input of the AND gate. The logic function of the AND gate produces the impulse wave having a width commensurate with the delay time.

Also provided is an analog preprocessor for individually processing multiple frequency bands in a composite RF signal. The analog preprocessor comprises a power splitter connected to an antenna to receive the composite RF signal and split the signal into a plurality of composite RF signals of identical spectral content and substantially equal power. The composite RF signals are directed to a bank of signal modifiers each configured to isolate a frequency band of interest. A power combiner receives the output signal from each of the signal modifiers and combines the outputs into a single controlled composite RF signal. The controlled composite RF signal is then provided to the image converter.

Further provided is a transmitter with automatic level control that restrains the peak output of a power amplifier to within its dynamic range. The transmitter includes a digital-to-analog converter (DAC) to convert a plurality of digital input signals into analog signals. An image converter receives and mixes the plurality of analog input signals with an impulse signal to generate an alias signal spectrum. An analog post-processor separates from the alias signal spectrum a plurality of desired bandlimited signals, attenuating all other alias signals to a non-interfering power level, so that each band limited signal can be separately modified. The plurality of bandlimited signals are recombined into a transmit signal for a power amplifier. A processor is configured to monitor a power level of the plurality of input signals and dynamically, separately modify one of the plurality of band limited signals with a command signal to the analog post-processor in response to a change in the power level in the corresponding input signal.

DETAILED DESCRIPTION OF THE ILLUSTRATED EMBODIMENTS

This application is related to copending application Ser. No. 13/342,427, titled "Channelized Multicarrier Digitizer," filed on Jan. 3, 2012, the entire contents of which are incorporated by reference.

Disclosed is a wideband spectrum receiver that receives a wideband spectrum signal and bandlimits a plurality of frequency sub-bands within the wideband spectrum signal before it collapses the signals, via aliasing, into a narrow bandwidth, and then computes the frequency for a signal of interest. The receiver is capable of simultaneously viewing the entire spectrum in order to identify a signal of interest, and then determine its frequency with minimal risk of overlooking an intervening signal of interest while the receiver is calculating the frequency for the first signal of interest. This is because the receiver takes a snap-shot of the entire spectrum every Fast Fourier Transform (FFT) sample set, which can typically amount to a scan every 4 microseconds depending upon the physical implementation. As a result, the receiver has a near 100% probability of intercept for any signal of interest.

Figure 1A:
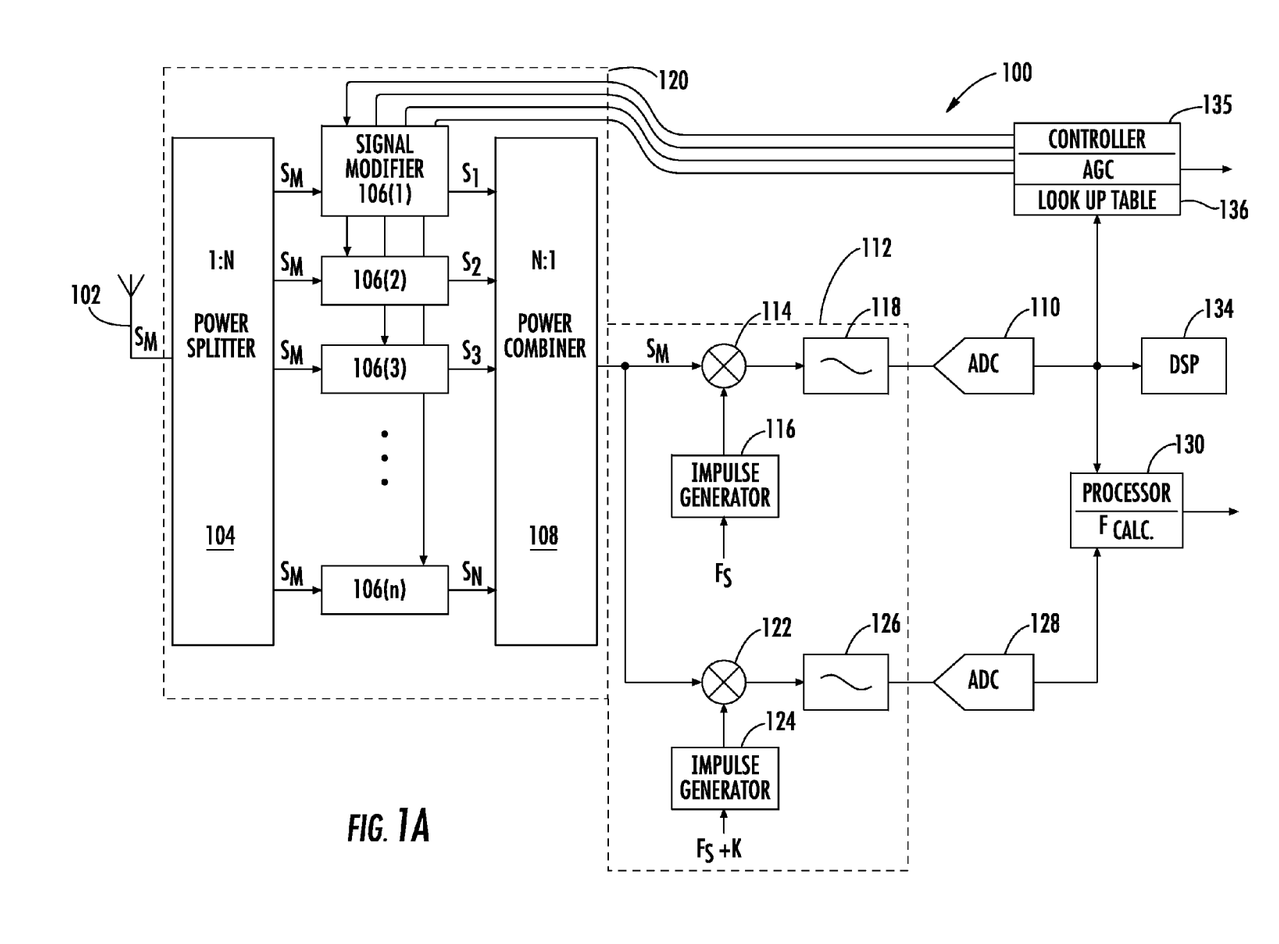
FIG. 1A is a block diagram of a wideband spectrum receiver formed in accordance with an embodiment of the present invention.

FIG. 1 shows a wideband spectrum receiver 100. Receiver 100 is operable to separate and control the power level (i.e. the gain or attenuation) of each one of a plurality of frequency sub-bands S1 to Sn and then to recombine and down-convert the frequency sub-bands S1 to Sn to baseband for digitization by an analog-to-digital converter (ADC) 110. After digitization of the frequency sub-bands S1 to Sn, the frequency for a signal of interest is calculated. The power level control allows the frequency sub-bands S1 to Sn to be applied to a limited dynamic range ADC 110. This provides for continuous digitization of the spectrum with individual dynamic gain control for each one of the frequency sub-bands S1 to Sn to limit signal interruption of the signal of interest.

The frequency sub-bands S1 to Sn each occupy their own frequency band within the wideband spectrum signal that is received by an antenna 102. Antenna 102 effectively combines the wideband spectrum signal to form a multicarrier signal Sm. The power levels of each of the sub-bands S1 to Sn may differ widely by the time they reach the antenna 102, as, for example, in cellular communications where each signal originates from a mobile user at a different location. These power variations are substantially compensated for by an analog preprocessor 120 that isolates the received power levels of each carrier and responds to gain control signals to enable efficient digital signal processing to follow.

Analog preprocessor 120 receives the multicarrier signal Sm and splits it into N electrical paths by a 1:N power splitter 104. Power splitter 104 can be any conventional signal-splitting component, including a passive or active component, or frequency selective network, provided it has controlled impedance, which is 50 ohms for radio systems.

A unique aspect to analog preprocessor 120 is the lack of preconditioning filter and amplifier between antenna 102 and power splitter 104. In prior art RF receivers, a low pass or band pass filter is tuned for a pass-band corresponding substantially to the allocated frequency range for S1 to Sn. The filter is followed by a low-noise amplifier (LNA) to enhance noise figure performance of the remaining circuitry in the receiver. Instead, analog preprocessor 120 has signal modifier 106 following power splitter 104 that eliminates the need for such preconditioning signal components, thus avoiding the risk of overload and distortion of said amplifier due to exposure to the uncontrolled bandwidth of the composite antenna signal.

The bank of n signal modifiers 106 splits multicarrier signal Sm into separate bandlimited frequency sub-bands of identical spectral content and substantially equal power. A bandlimited signal is one that has negligible out-of-band leakage. The out-of-band leakage is proportional to the sampling frequency in that the better suppression of the out-of-band leakage, the lower the sampling frequency required to convolve the individual signals to baseband, i.e. the zero-center frequency, which will be discussed in detail below.

Each signal modifier 106 operates to control the gain and filter out one of a plurality of frequency sub-bands S1 to Sn. The resulting output of signal modifier 106($a$)-($n$) corresponds to a unique frequency sub-band S1 to Sn, which bands may have equal or unequal bandwidth or even weighted bands. Each sub-band S1 to Sn contains the vector sum of all the signals falling within its bandpass.

The frequency sub-bands S1 to Sn are isolated from multicarrier signal Sm by a combination of low-cost, low-loss surface acoustic wave filters ("SAW filter"), digital attenuators, and amplifiers to control the gain and attenuation and band-limit the output signal. The SAW filters convert an electrical signal into a mechanical wave. The surface wave propagates across the device where it is converted back to an electrical wave. The SAW filter delays the output signal by time ( ) and increases the stopband attenuation to produce a finely tuned bandlimited signal with negligent out of band leakage. The digital attenuators reduce the gain of the signal to keep the maximum signal applied to the amplifier below the amplifier's threshold. The digital attenuators are sequenced to reduce the gain in steps, in order to prevent overload of the amplifiers. The digital attenuators in the preferred embodiment have a 1,000:1 attenuation and respond sequentially to a command signal provided by controller 116. The amplifiers, on the other hand, increase the gain of the signal. The amplifiers, in the preferred embodiment, are constant gain amplifiers with a 10:1 gain. The number and arrangement of amplifiers, filters, and attenuators is established by cascade noise and intermodulation analysis techniques, and any arrangement of RF band pass filters can be used so long as they provide sufficient out-of-band attenuation.

Figure 2:
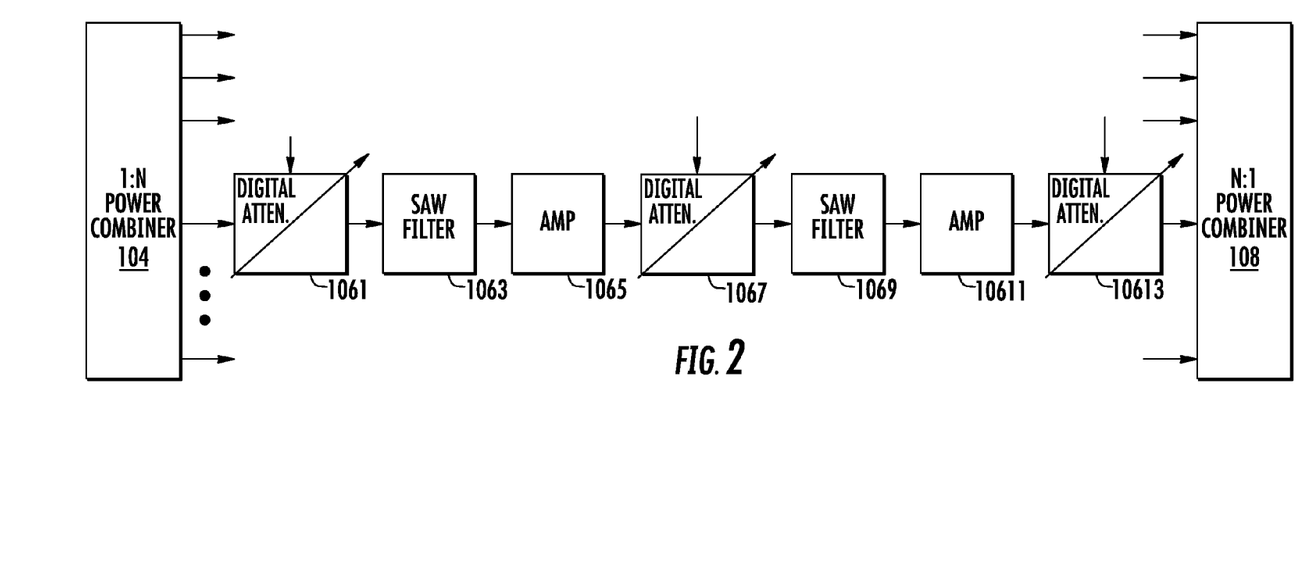
FIG. 2 is a block diagram of a signal modifier found in the wideband spectrum receiver of FIG. 1A.

FIG. 2 shows signal modifier 106. Beginning with digital attenuator 1061, multicarrier signal Sm is attenuated before being bandlimited by SAW filter 1063. Digital attenuator 1061 is positioned ahead of SAW filter 1063, because the RF circuitry requires a controlled 50-ohm impedance and SAW filter 1063 only has 50-ohm impedance in its pass band. Outside its pass band, SAW filter 1063 has an uncontrolled impedance. Amplifier 1065 amplifies the output of SAW filter 1063 then digital attenuator 1067 attenuates the signal. A second SAW filter 1069 further band-limits the signal followed by further amplification by amplifier 10611 and attenuation by digital attenuator 10613. The resulting output of digital attenuator 10613 is a gain controlled bandlimited frequency sub-bands S1 to SN. The number of amplifiers, filters, and attenuators can be adapted for various implementations.

The gain controlled, bandlimited frequency sub-bands S1 to Sn corresponding to the N paths are applied to an N:1 power combiner 108 where they are combined into a controlled composite RF output signal S'm that appears at the input of image converter 112.

Controlled composite RF output signal S'm comprises gain controlled, bandlimited frequency sub-bands S1 to Sn, and is hereinafter referred to as the "Banded Input" signal. Power combiner 108 can be any conventional signal-combining component, including a passive or active component, or frequency selective network, provided it has a controlled impedance, which is 50 ohm for radio systems.

Image converter 112 is an analog frequency down-converter that behaves similar to the sampling process of an ADC by down-converting the Banded Input signal down to baseband to create an alias-band output signal. Image converter 112 includes a wideband analog microwave mixer 114 driven by an impulse generator 116 that generates a stream of impulses at a frequency Fs. Mixing the Banded Input signal with an Fs impulse causes a fanfold of aliases (shown in FIG. 5B) just as it would if the Banded Input signal were digitized with an ADC. The frequency spectrum on either side of every integer harmonic of Fs, including the fundamental frequency, is convolved by the sampling process to baseband. The resulting output of mixer 114 is filtered with a low-pass filter 118 tuned to Fs/2 generating the alias-band output shown in FIG. 5B. The 0 to Fs/2 baseband spectrum contains all the signals found in the entire Banded Input signal.

Figures 5A, 5B:
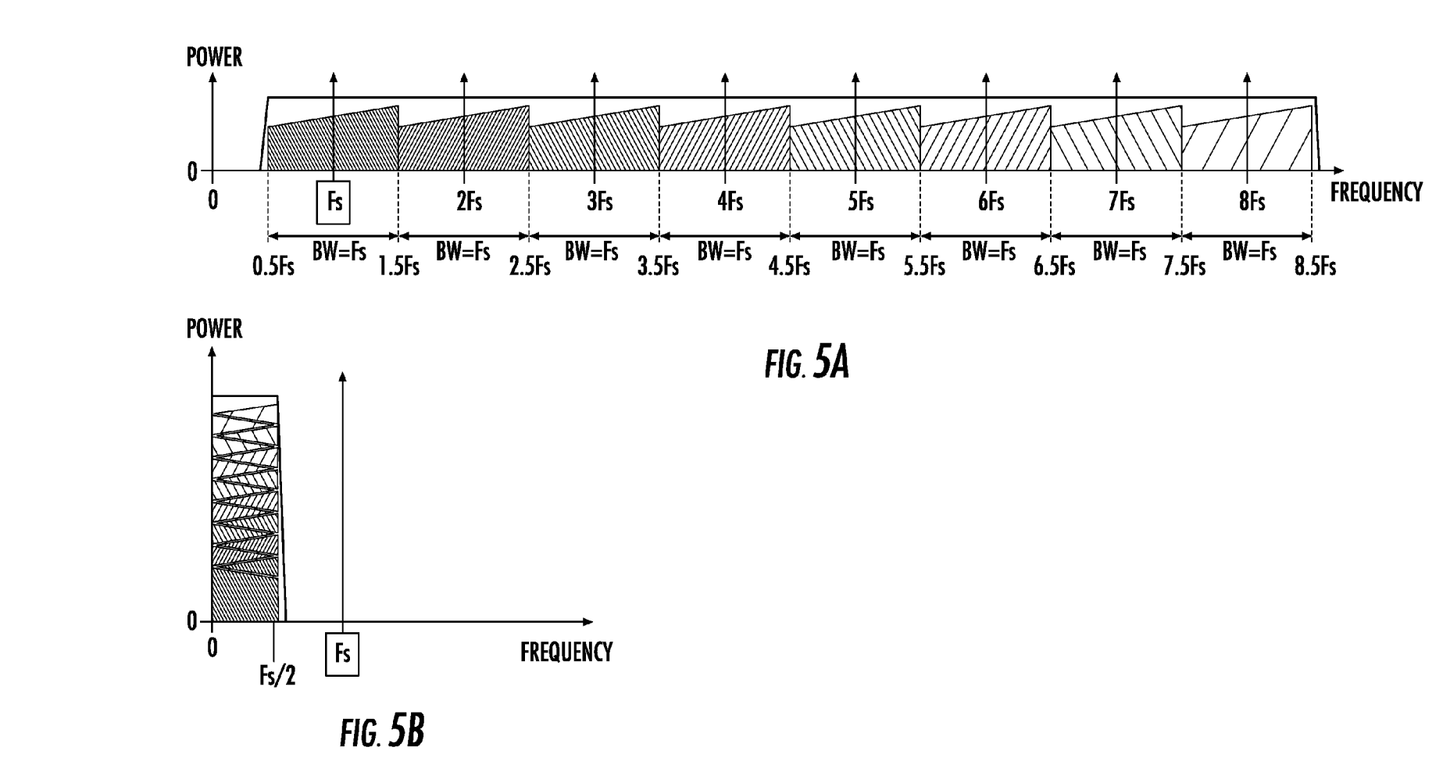
FIG. 5A is a chart showing a bandlimited RF input spectrum overlaid with an impulse wave at frequency Fs.
FIG. 5B is a chart showing an alias-band output signal of the image converter of FIG. 1A or FIG. 1B from the input spectrum shown in FIG. 5A mixed with the impulse wave tuned to the frequency Fs.

The content of the Fs/2 alias-band spectrum, shown in FIG. 5B, contains every signal entering the system from antenna 102. Referring to FIG. 5A and assuming an Fs=2 GHZ, the wideband spectrum signal with eight input sub-bands S1 to S8 is 17 GHZ. Mixing this wideband spectrum signal with an impulse wave, aliases input sub-bands S1 to S8 into a 0-1 GHz baseband, shown in FIG. 5B. The eight input sub-bands S1 to S8 may randomly fall on top of each other, or close to each other, thereby causing some interference, but all the signals are present. This means that the power level for each signal is identifiable, but not the RF frequency for any given signal, because all the 1-17 GHz signals have been translated down to a 0-1 GHz baseband with no way to tell which input sub-bands S1 to S8 the particular signal came from. However, the presence of a new signal anywhere within the 1-17 GHz spectrum can be measured instantly.

The absolute frequency for the signal of interest is determined with an image converter 112, comprised of mixer 114 and impulse generator 116, and mixer 122 and impulse generator 124. Impulse generators 116 and 124 are tuned to different frequencies for creating two different alias-band output signals, and a processor 130 configured to recognizing the shift in the relative position of the signal of interest with respect to the sampling frequency in the two alias-band output signals. FIG. 1 shows a first embodiment of image converter 112 that includes two mixing circuits for generating two alias-band output signals. The Banded Input signal is simultaneously provided as an input to mixers 114 and 122 that are driven with impulse generators 116 and 124, respectively, tuned to frequencies Fs and Fs+k, respectively. "k" is preferably equal to about one FFT frequency bin bandwidth of the FFT size employed. The Banded Input signal is separately mixed with the two impulse waves, Fs and Fs+k, in mixers 114 and 122, respectively, with the outputs filtered with low pass filters tuned to Fs/s and (Fs+k)/s 118 and 126, respectively, and digitized by ADC 110 and ADC 128, respectively, and received by a processor 130.

Figure 1B:
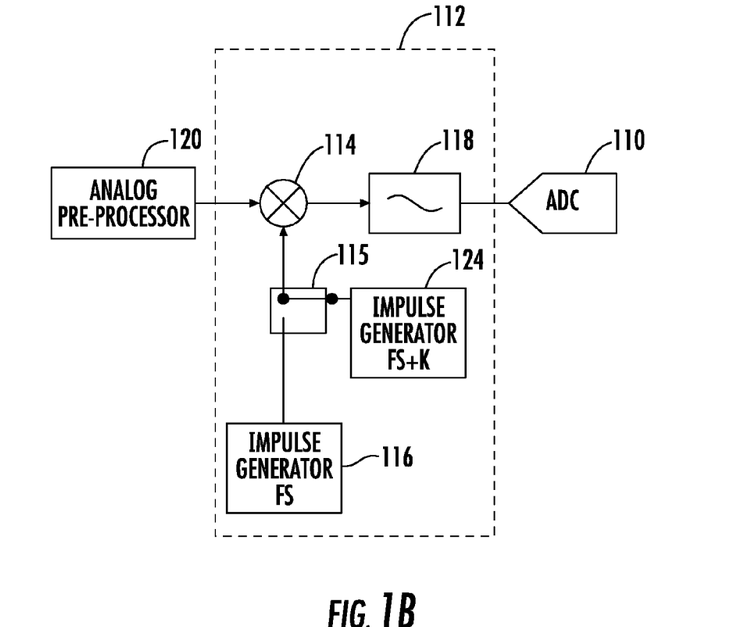
FIG. 1B is a block diagram of an alternative embodiment for an image converter found in the wideband spectrum receiver of FIG. 1A.

FIG. 1B shows a second embodiment of image converter 112 that includes a single mixer 114 used with a single tunable impulse source to switch by switching with a switch 115 between two impulse generators 116 and 124 tuned to frequencies Fs and Fs+k, respectively. Switch 115 is timed to switch between impulse generators 116 and 124 after each FFT sample. Alternatively, a single impulse generator 116 that retunes between frequencies Fs and Fs+k is used.

Figure 6A:
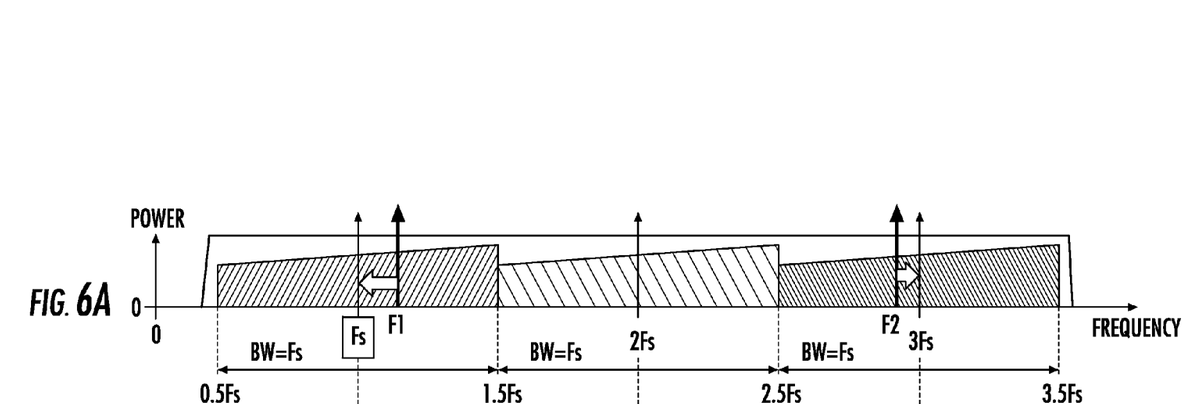
FIG. 6A is a chart showing an RF input spectrum with two signals of interest and their relation to impulse signal Fs generated by the impulse generator.
Figures 6B, 6C:
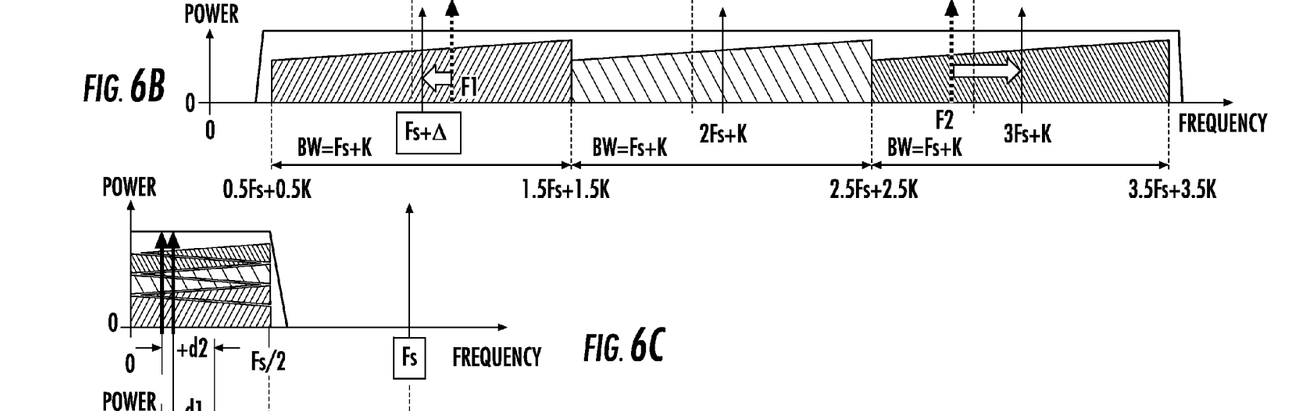
FIG. 6B is a chart showing an RF input spectrum with two signals of interest and their relation to impulse signal Fs+k generated by the impulse generator.
FIG. 6C is a chart showing the output of the image converter from the input spectrum shown in FIG. 6A mixed with an impulse wave tuned to the frequency Fs.

The process for determining the absolute frequency for the signal of interest is illustrated in FIGS. 6A-6D. FIG. 6A shows the spectral position of desired signals F1 and F2 in the Banded Input signal with respect to the sample frequency Fs. FIG. 6C shows the spectral position of desired signals F1 and F2 after the Banded Input signal is mixed with impulse wave Fs and down-shifted to baseband.

FIG. 6B shows the spectral position of desired signals F1 and F2 in the Banded Input signal with respect to the sample frequency Fs+k and with respect to the position of the sampling frequency Fs. The distance between F1 and the fundamental impulse has shrunk by a distance k and the distance between F2 and the third harmonic impulse increased by a distance 3k.

Figure 6D:
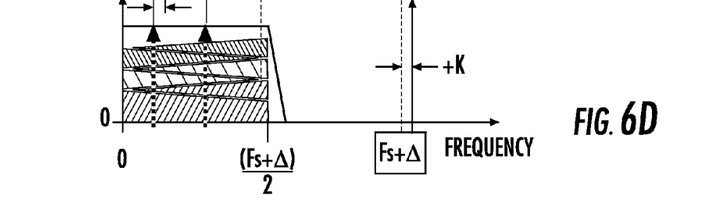
FIG. 6D is a chart showing the output of the image converter from the input spectrum shown in FIG. 6B mixed with an impulse wave tuned to the frequency Fs+k.

The shift in the relative position of the desired signals F1 and F2 with respect to the sampling frequency shows up in the output of mixers 118 and 122. FIG. 6D shows the spectral position of desired signals F1 and F2 after the Banded Input signal is mixed with impulse wave Fs+k and down-converted to baseband. By comparing FIG. 6C with FIG. 6D, it is apparent that the mixing process results in a significant baseband frequency change for F1 and F2. F1 is shifted downward in frequency by d1, and F2 is shifted upward in frequency by d2. The RF frequency for the signals of interest F1 or F2 can be calculated in processor 130 having programmed thereon the following algorithm:

$$F = \left| \frac{F_{shift}}{Fs_{shift}} * (Fs+k) - F_b \right|$$

where F is the frequency for the signal of interest, $F_{shift}$ is the frequency shift of the signal of interest, $Fs_{shift}$, is the frequency shift of Fs, Fs is the sampling or clock frequency, k is the change in the sampling frequency, and $F_b$ is the absolute frequency of the desired signal in the first alias band.

There are other ways for implementing an algorithm for determining the frequency for a signal of interest. The various implementations require digitization followed by an FFT conversion, then correlating the signal of interest between the shifted and un-shifted FFT spectra. The simplest approach is to use the computed FFT bins, each of which represents the signal power in that bin's spectral bandpass. Because, an FFT bin equals a narrow bandpass filter, so the power levels of each bin can be compared until a match is found. Signal resolution can be improved with a much larger FFT sample size.

Another implementation requires computing another FFT with a different shift in Fs, and search that shift window. A different shift value will move all the signals into a very different pattern to reveal a signal from another interfering signal, then scan within the shift window for a signal of the same amplitude as before.

Yet another implementation requires a binary search with the analog preprocessor 120. Turn off half of the channels, i.e. signal modifiers 106(1)-106(1/2n) by setting the attenuators in those channels to the maximum. Then execute an FFT cycle and see if the signal of interest drops into the noise, if it does, it is in one of the bands that were just attenuated. Proceed to attenuate half of those bands and look for a drop out, and so forth. In an example with 16 bands, only 4 FFT cycles are required to unambiguously identify for any signal of interest the corresponding sub-band among S1 to Sn.

Figure 3:
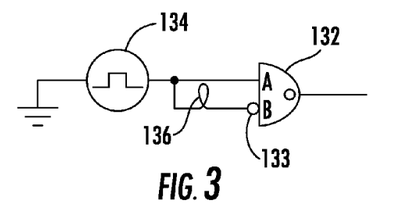
FIG. 3 is an impulse generator for driving an image converter found in the wideband spectrum receiver of FIG. 1A.

FIG. 1 shows impulse generators 116 and 124, which are both the same except for their frequency, however, for the sake of convenience only impulse generator 116 is discussed. FIG. 3 shows an implementation for impulse generator 116, including an AND gate 132 with an inverter 133 at the B input, a square wave generator 134, and a delay 136 between square wave generator 134 and the B input to AND gate 132. AND gate 132 has two inputs, A and B, and an output, O. The B input is inverted with respect to the A input by inverter 133. In other words, when the A input is high the B input is low, and when the A input is low the B input is high. Delay 136 delays the signal to the B input with respect to the A input by a time, "d".

Figure 4:
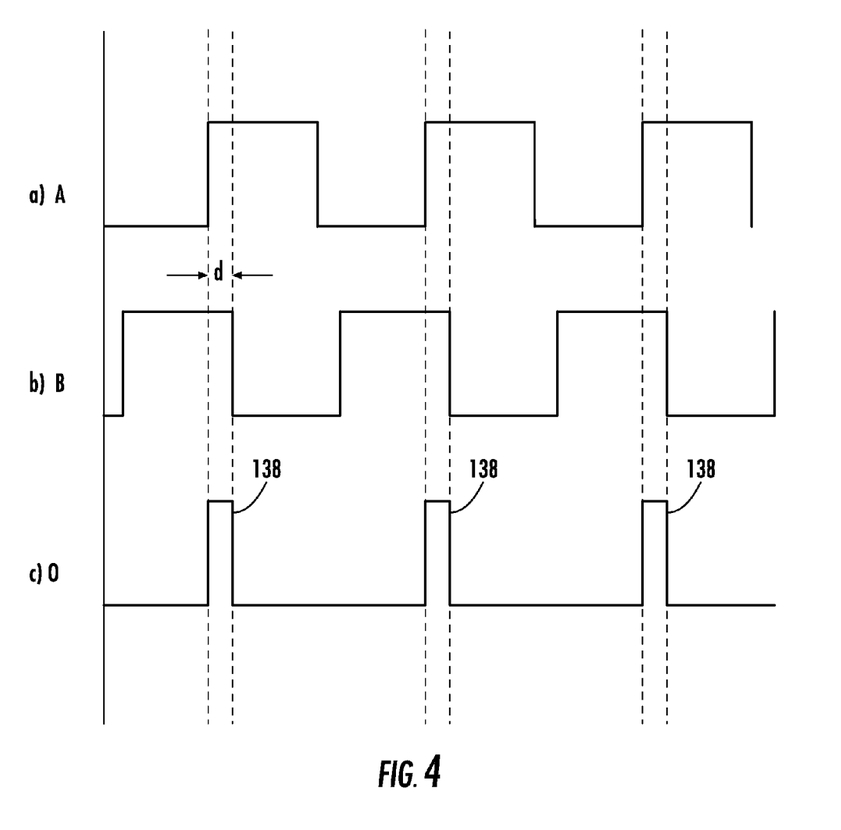
FIG. 4A is a square wave input into a first input port of the impulse generator of FIG. 3.
FIG. 4B is a delayed and inverted square wave input into a second input port of the impulse generator of FIG. 3
FIG. 4C is the impulse-wave output signal of the impulse generator from FIG. 3.

FIG. 4(a) shows a timing diagram for a square wave signal generated by square wave generator 134 to the A input of AND gate 132. FIG. 4(b) shows a timing diagram for the square wave signal generated by square wave generator 134, but delayed by a time "d" by delay 136 and inverted by inverter 133. The function of AND gate 132 requires a high signal on the A and B inputs to obtain a high signal at the output. FIG. 4(c) shows a timing diagram for the output of AND gate 132. The output is a succession of impulses 138. Obviously, decreasing time "d" shrinks the width of impulses 138. In operation, time "d" is sufficiently small, typically on the order of 100 picoseconds, to generate a momentary impulse at the output of AND gate 132. Delay 136 is implemented by having a connecting transmission line distance greater than the distance between square wave generator 134 and the B input to AND gate 132 than the distance between square wave generator 134 and the A input to AND gate 132. This can be accomplished by increasing the transmission line length to the B input.

More specifically, AND gate 132 and inverter 133 is implemented with an integrated circuit with AND gate function having invertible inputs. An example of such a circuit is the HMC722LP3E manufactured by Hittite Microwave Corporation of Chelmsford, Mass. The HMC722LP3E has an AND gate function designed to support data transmission rates up to 13 Gbps and clock frequencies as high as 13 GHz. The disclosed embodiment for impulse generator 116 represents one way of generating an impulse wave with a logic gate. Any means of converting a square wave to an impulse wave with at least one logic gate is embodied by the instant disclosure.

As previously stated, the output of image converter 112 is provided to ADCs 110 and 128. ADCs 110 and 128 convert a continuous time signal to a discrete time signal. The resolution of the ADC indicates the number of discrete values it can produce over the range of analog values, and is typically expressed in bits. The sample rate (also referred to as the sampling frequency, clock rate, or clock frequency) of the ADC determines the maximum frequency it can digitize. This maximum frequency corresponds to the well-known Nyquist Sampling Theorem, which simply states that to unambiguously create a useful digital sample stream, one must sample a signal at a sample rate no less than twice the frequency of the signal (or the highest signal in a group of signals to be digitized simultaneously). This may be interpreted, and applied, to either the highest frequency, or the bandwidth of the signal to be digitized regardless of its absolute frequency.

The input bandwidth of the ADC determines the highest frequency signal that will be digitized. The input bandwidth must at least equal the highest absolute frequency to be digitized, regardless of total bandwidth or sampling frequency (for both undersampling and oversampling cases). Because the Banded Input signal has been aliased to baseband and filtered to a bandwidth of Fs/2 and (Fs+k)/2, the size of ADC 110 and ADC 128 has been greatly reduced. The aliased signal can be digitized at a sampling rate of Fs and Fs+k, respectively.

The required performance of ADCs 110 and 128 is further reduced by dynamically attenuating the power level of the individual sub-bands S1 to Sn with a controller 135. ADCs 110 and 128 are constrained to operate within their dynamic range by separating the individual bands so power spikes within any one frequency band can be individually suppressed before the power spikes drive either ADC 110 or 128 beyond its dynamic range. This means ADCs 110 and 128 do not need to be over-specified to anticipate the power spikes.

ADCs 110 and 128 are readily available commercial off-the-shelf components constrained to operating within a limited dynamic range. Because the Banded Input signal is constrained to operate within the dynamic range of ADCs 110 and 128, a momentary power spike in any one of frequency sub-bands S1 to Sn is immediately suppressed by analog preprocessor 120 to preserve the integrity of the weaker frequency sub-bands S1 to Sn that make up the Banded Input signal.

The resulting digital input to a Digital Signal Processor (DSP) 134 is monitored by controller 135 for power spikes within the output of ADC 110 so that it dynamically responds to modify the appropriate sub band S1 to Sn by controlling the corresponding signal modifier 106(1)-106(n) to keep the resulting output of ADC 110 within its dynamic range. A signal of interest or sub band S1 to Sn within Banded Input signal, in some instances, is weaker than the other signals or sub-bands. Controller 135 continuously monitors and controls the power level of frequency sub-bands S1 to Sn in order to prevent a weaker signal of interest from being overpowered by stronger signals or destabilizing the receiver when peak envelop power is exceeded.

Controller 135 employs a time-to-frequency domain conversion on the output signal of ADC 110 combined with automatic gain control of signal modifiers 106. In one embodiment, controller 135 is a field-programmable gate array (FPGA) that receives continuous samples from ADC 110 and does a periodic fast FFT. Any type of FFT implementation can be employed. Controller 135 has software operable thereon to compute the frequency for the signal with the high power level in order to determine its corresponding sub-bands S1 to SN using the previously discussed algorithms. However, only signals above a threshold value that require gain reduction need to have their frequencies computed, thereby greatly decreasing the computational load for controller 135. A look-up table 136 residing on controller 135 allows controller 135 to quickly identify the offending sub-bands S1 to Sn and send an attenuation command signal to the appropriate signal modifier 106.

Figure 7:
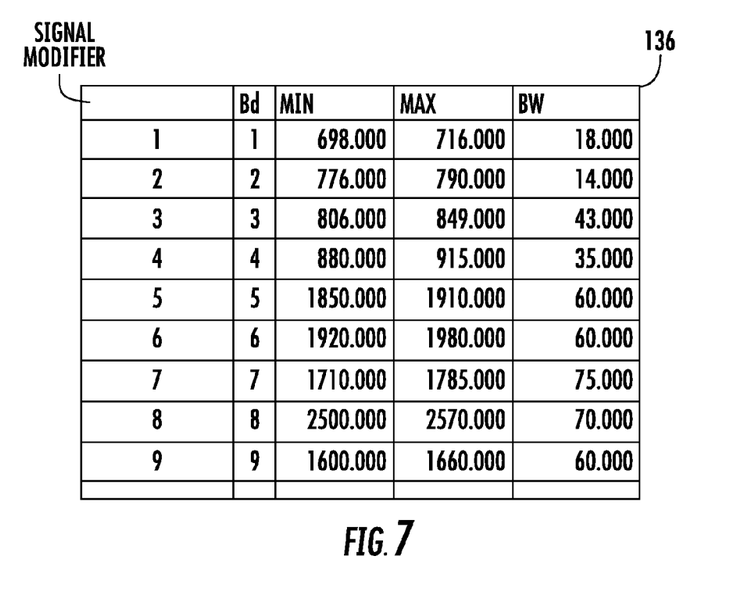
FIG. 7 is a look-up table found in the controller for the wideband spectrum receiver of FIG. 1A illustrating a correlation between the signal modifiers found in the analog preprocessor and the frequency sub-bands.

FIG. 7 shows look-up table 136 residing on controller 135. Look-up table 136, in the illustrated embodiment, associates nine signal modifiers 106(1)-106(9) with nine signal bands S1-S9, wherein each signal band has a corresponding frequency range. Controller 135 can quickly compare a frequency or band of interest with look-up table 136 to determine the appropriate signal modifier to receive an attenuation command signal.

The significance of the FFT gain control scheme is that if a strong signal is present, only the gain in that signal's channel will be reduced, not the other channels. The goal is to avoid pushing weaker signals into the noise floor when a strong signal appears in another band. Bands that are likely to have weak signals or bands that are of more importance can have the maximum allowable threshold set higher. Conversely, bands of minimal interest will have the threshold set lower, so that gain is reduced and strong signals will be received, but weaker signals will be attenuated below the noise floor. Threshold values can be varied dynamically if desired in order to scan the entire spectrum more thoroughly and not risk missing unexpected signals of interest. Regardless of the threshold settings and cycle times, the algorithm is allocating the fixed spurious free dynamic range of the ADC among the channels in a predetermined manner.

Controller 135 can also allocate gain to frequency subbands S1 to Sn in order of importance. The most important channel will be amplified followed by the second and so on, and so forth until the dynamic range of the ADC 110 is reached. This way the most important signals are boosted and the least important signals are attenuated.

Figure 8:
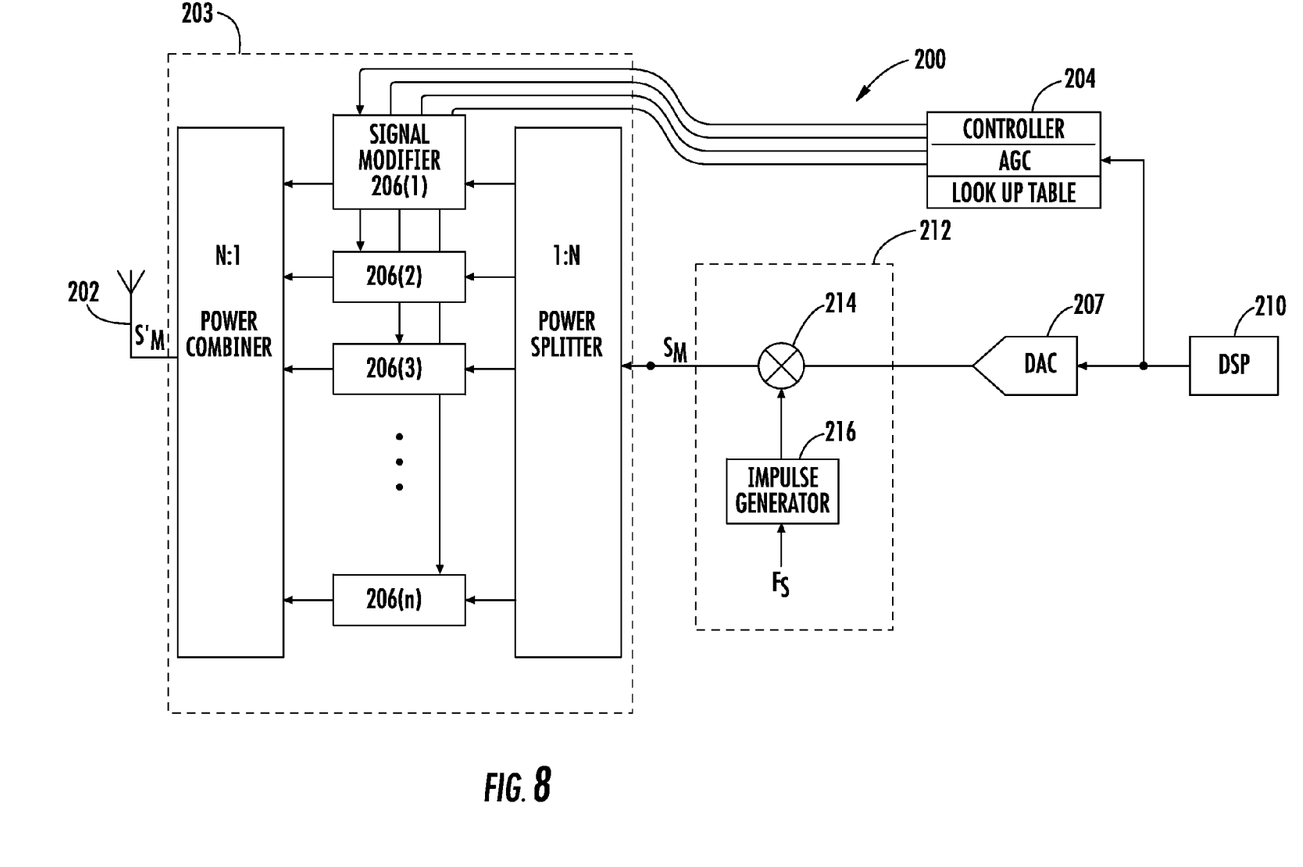
FIG. 8 is a block diagram of a wideband spectrum transmitter formed in accordance with an embodiment of the present invention.

An alternative embodiment discloses a wideband, multichannel spectrum transmitter 200 with automatic level control. A plurality of desired signals are combined, either digitally in a DSP 210 or in analog after having been converted from digital to analog signals by a DAC 207, to create a plurality of low frequency, intermediate-frequency (IF) signals falling within the band between 0 and Fs/2. The IF signals are mixed in an image converter 212 with an impulse wave generated by a mixer 214 tuned to Fs, in order to create an alias spectrum signal. The alias spectrum signal includes reoccurring IF signals at harmonics of Fs, centered around baseband and, with respect to their harmonic replicas, are continuous and non-overlapping.

Post-processor 203 has a plurality of n signal modifiers 206(1)-(n) that operate to control the gain and band-limit carrier signals S1 to Sn to isolate the desired signals. The bank of n signal modifiers 206 subdivide the alias spectrum signal into separate carrier signals S1 to Sn, which may have equal or unequal bandwidth or even weighted bands. In this regard, signal modifiers 206 operate in the same manner as signal modifiers 106 in system 100. Each desired signal is isolated by a corresponding signal modifier 106 and the unwanted, interference signals generated by image converter 212 are attenuated.

Signal modifiers 206 in post-processor 203 are controlled by controller 204, which is functionally equivalent to controller 135 in system 100. Controller 204 monitors the input of an DAC 206 for power spikes in order to respond dynamically to attenuate or amplify the appropriate carrier signal S1 to Sn by controlling the corresponding signal modifier 106. The dynamic monitoring of the input signal by controller 204 keeps power amplifier 202 and DAC 207 within their dynamic ranges of operation, such that the vector-sum peaks of the simultaneous signals are controlled so as to prevent distortion.

Reference has been made to several components throughout this disclosure as though each component is a unique component. One skilled in the art will readily recognize, however, that the various systems, engines, and controllers can be incorporated into one or more other systems, engines, and controllers thereby reducing the number of components. For example, controller 135 can reside in processor 130.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

What is claimed is:

1. A transmitter, comprising:
   a digital-to-analog converter (DAC) to convert a plurality of input signals from a digital representation thereof to an analog representation thereof;
   an image converter combined to the DAC to receive and mix the plurality of input signals with an impulse signal to generate an alias signal spectrum;
   an analog post-processor combined with the image converter to receive the alias signal spectrum and separate from the alias signal spectrum a plurality of bandlimited signals and recombine the plurality of bandlimited signals into a transmit signal;
   a processor configured to monitor a power level of the plurality of input signals and dynamically, separately modify one of the plurality of bandlimited signals with a command signal to the analog post-processor in response to a change in the power level in the corresponding input signal;
   a power amplifier combined with the analog post-processor to receive the transmit signal; and
   an antenna combined to the power amplifier to receive and transmit the transmit signal.

2. The transmitter of claim 1, wherein the image converter further comprises an impulse wave generator configured to generate successive impulses at frequency Fs.

3. The transmitter of claim 2, wherein the impulse generator further comprises a logic gate that transforms a square wave input into an impulse wave output.

4. The transmitter of claim 3, wherein the logic gate is an AND gate having two inputs, the AND gate receives the square wave at a first input and receives a delayed and inverted square wave at a second input and produces the impulse wave output.

5. The transmitter of claim 1, wherein the analog post-processor further comprises a plurality of signal modifiers each having an input node, an output node, and a control node, wherein the signal modifiers are each configured to receive at the input node the alias signal spectrum and separate the alias signal spectrum into a plurality of bandlimited signals that correspond with a frequency band of interest within the alias signal spectrum, and wherein the command signal from the processor is received at the control node for the signal modifier that corresponds with one of the plurality of input signals to modify a power level of the bandlimited signal before the plurality of bandlimited signals are recombined into the transmit signal.

6. The transmitter of claim 1, and further comprising a look-up table in the processor for identifying an appropriate signal modifier among a plurality of signal modifiers for modifying an appropriate bandlimited signal.

7. The transmitter of claim 1, wherein the signal modifiers further comprise a first digital attenuator to reduce a gain of the alias signal spectrum followed by a filter to band-limit the alias signal spectrum to generate the bandlimited signal.

8. The transmitter of claim 7, wherein the signal modifiers further comprise a second digital attenuator electrically connected to the filter to reduce the gain of the bandlimited signal and a second filter to further band-limit the bandlimited signal.

9. The transmitter of claim 8, wherein the signal modifiers further comprise a third digital attenuator electrically connected to the second filter to reduce the gain of the bandlimited signal and a third filter to further band-limit the bandlimited signal.

10. The transmitter of claim 9, wherein the first, second, and third digital attenuators are electrically connected to the processor to respond to a control signal to modify the bandlimited signal in response thereto.

11. The transmitter of claim 10, wherein the first, second, and third digital attenuators are sequenced to modify the gain of the bandlimited signal in steps.

12. A circuit comprising:
    an image converter to receive and mix a plurality of input signals with an impulse signal to generate an alias signal spectrum;
    an analog post-processor combined with the image converter to receive the alias signal spectrum and separate from the alias signal spectrum a plurality of bandlimited signals and recombine the plurality of bandlimited signals into a transmit signal; and
    a processor configured to monitor a power level of the plurality of input signals and dynamically, separately modify one of the plurality of bandlimited signals with a command signal to the analog post-processor in response to a change in the power level in the corresponding input signal.

13. The circuit of claim 12, and further comprising a power amplifier combined with the analog post-processor to receive the transmit signal.

14. The circuit of claim 13, and further comprising an antenna combined to the power amplifier to receive and transmit the transmit signal.

15. The circuit of claim 14, and further comprising a converter to convert a plurality of input signals from a digital representation thereof to an analog representation thereof.

\* \* \* \* \*